United States Patent [19]

May, Jr.

[11] 4,382,164
[45] May 3, 1983

[54] SIGNAL STRETCHER FOR ENVELOPE GENERATOR

[75] Inventor: Carl J. May, Jr., Holmdel, N.J.

[73] Assignee: Bell Telephone Laboratories, Incorporated, Murray Hill, N.J.

[21] Appl. No.: 202,336

[22] Filed: Oct. 30, 1980

Related U.S. Application Data

[62] Division of Ser. No. 115,185, Jan. 25, 1980, Pat. No. 4,277,645.

[51] Int. Cl.³ .............................................. H04B 3/20
[52] U.S. Cl. ................................................. 179/170.2
[58] Field of Search ............... 179/170.2, 170.4, 170.6, 179/1 HF

[56] References Cited

U.S. PATENT DOCUMENTS

| | | | |
|---|---|---|---|
| 3,823,275 | 7/1974 | LaMarche et al. | 179/170.2 |
| 4,005,277 | 1/1977 | Araseki | 179/170.2 |
| 4,028,506 | 6/1977 | Araseki | 179/170.2 |
| 4,029,912 | 6/1977 | Geigel | 179/170.2 |

*Primary Examiner*—Emanuel S. Kemeny
*Attorney, Agent, or Firm*—John Francis Moran

[57] ABSTRACT

A speech detector uses a signal classifier (19) to identify portions of a representation of the average magnitude of a group of signal samples indicative of either speech or noise. A controller (33) in the signal classifier follows a four state sequence using appropriate time constants for signal measures in a variety of signal conditions in defining the speech and noise portions of the representation. A level estimator (21) uses selectively obtained signal measures from the defined portions of the representation to provide adaptively variable decision levels. A speech definer (16) compares the representation to a first decision level and the signal samples to a higher decision level to indicate the occurrence of speech signal activity when either decision level is exceeded. In a two way transmission arrangement, a receive trunk speech detector uses a stretcher (133) to prevent adaptation of the transmit speech detector thresholds when echo signals are present.

2 Claims, 8 Drawing Figures

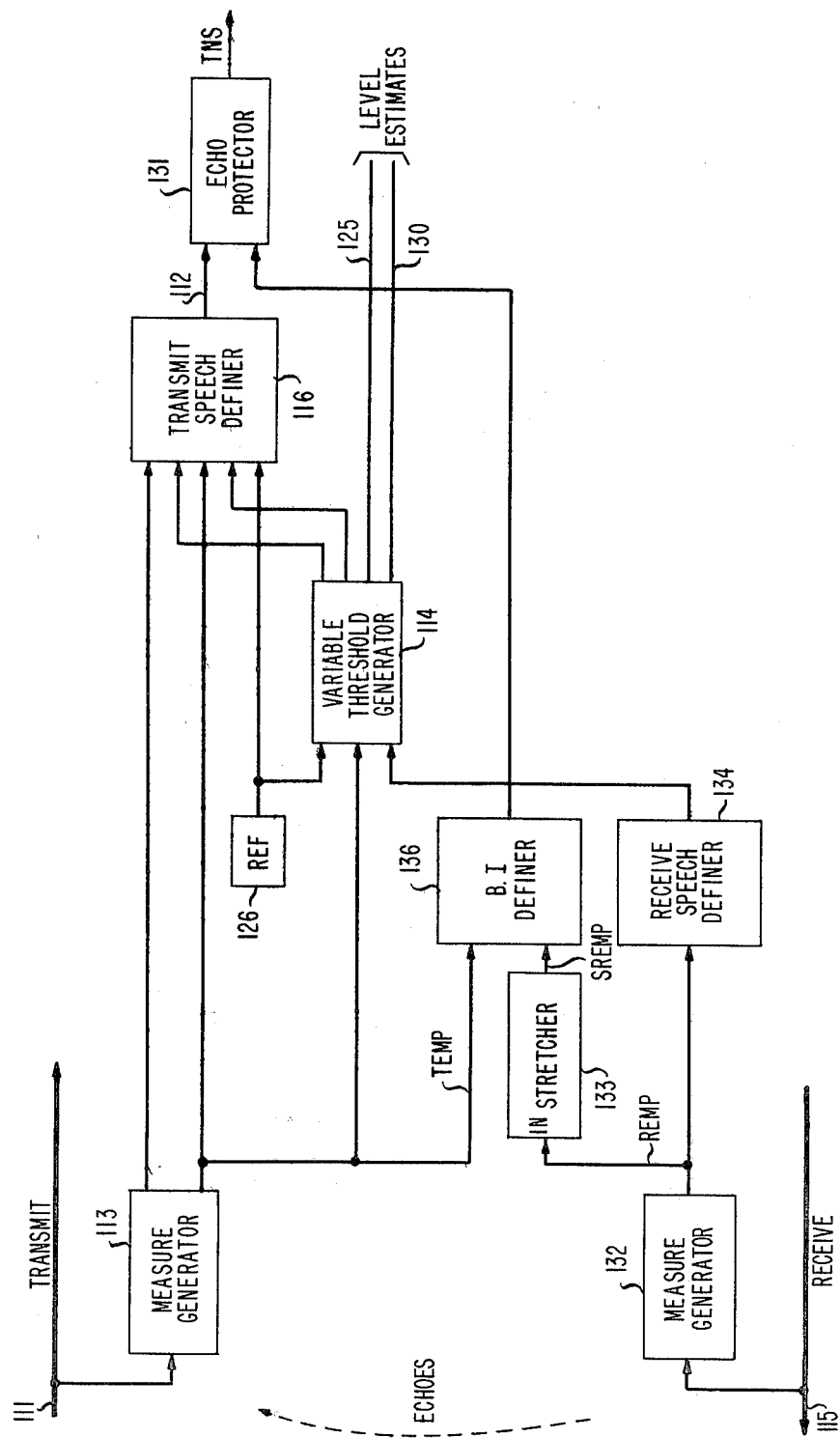

SIGNAL STRETCHER FOR ENVELOPE GENERATOR

This application is a division of copending application Ser. No. 115,185, filed Jan. 25, 1980.

BACKGROUND OF THE INVENTION

This invention relates to signal detecting arrangements and, more particularly, to arrangements for detecting speech activity in the presence of noise.

Speech detection arrangements are useful in a variety of communication systems in which speech transmission paths are established in response to the occurrence of speech signal activity. Some examples of the use of speech detection include speech interpolation and echo suppression break-in purposes. The signal measurement criteria or speech definition of conventional speech detectors is sufficiently deficient that it has been necessary to extend the speech indication beyond each signal satisfaction of the speech definition by a rather long hangover interval (100 milliseconds or more) to provide the perception of quality transmission over speech interpolation systems.

Speech detectors, particularly those used for speech interpolation, should ideally define the minimum time intervals during which a transmission path is needed by a customer, expressed in a percentage of total time called activity, so that the listener will perceive the connection as having a "good" quality. Hence, a speech detector should be highly sensitive to the presence of speech signals while at the same time remaining insensitive to non-speech signals. This may be achieved by an improved speech definition which enables the hangover interval to be minimized without degrading performance. Consequently, the poor speech definition of known arrangements for detecting speech have generally suffered from such limitations as undesirable speech clipping on the one hand and excessive activity on the other hand due to utilization of a poor speech definition coupled with excessive hangover and due to noise sensitivity.

A primary object of this invention is to provide an improved speech definition which allows a substantial reduction in the duration of hangover without producing the aforementioned drawbacks.

Another object of the present invention is to provide an improved method and arrangement for detecting speech activity in the presence of noise wherein noise level estimates are independently derived while talker volume estimates are derived in relationship to the noise level estimates.

A related object is to provide a signal classification process using an average representation of several signal samples wherein the signal classification process assigns appropriate time constants to signal measures of the representation while identifying portions which constitute speech and which constitute noise.

SUMMARY OF THE INVENTION

The invention classifies a signal using its average representation to indicate when prescribed signal attributes are characteristic of either speech or noise. A level estimator responsive to these indications provides a noise level estimate and then a first decision level. The first decision level is adapted by combining the noise level estimate and the results of a comparison between a signal measure of the speech portion of the representation and the current value of the first decision level. Each time the signal exceeds the first decision level, speech activity is indicated.

In some other aspects of the invention, speech activity is also indicated when the representation exceeds a second and lower decision level derived from the first decision level. The classifying means comprises measuring means for obtaining a peak and minimum values of the representation which a comparer utilizes to provide an output indicative of noise when the peak value is less than a prescribed constant times the minimum value. The level estimator compares the minimum to a stored long term minimum and adjusts the latter by a prescribed amount to reduce inequality of the comparison. The classifying means further comprises comparing means for providing an output indicative of speech when the peak value is greater than the sum of a predetermined factor times the minimum value plus a prescribed constant.

In some further aspects of the invention, the signal is sampled and digitally encoded so the level estimator includes a translator which uses the long term minimum to provide a noise level estimate compatible with the digitally encoded signal samples. The portion of the level estimator which provides the first decision level includes a comparer, an adjuster, a storer, and an adder. The comparer produces an output indicative of the relative magnitude of the peak value of the representation and the first decision level. The adjuster uses this output to produce a positive increment when the peak value exceeds the first decision level and a negative increment when the first decision level is larger than the peak value. The storer accumulates and retains these increments and provides a level indicative of talker volume relative to the noise level estimate. The adder combines the noise level estimate from the translator and the level indication to form the first decision level.

In still further aspects of the invention, echo protection is provided in a two-way arrangement. The arrangement prevents the utilization of echo signal energy in forming the adjustments of the variable threshold levels. Also, a stretcher or echo envelope generator provides an output whose amplitude corresponds to the greater of the representation of the signal energy in the received path or any other of previously occurred representations of the same type within a predetermined delay interval.

BRIEF DESCRIPTION OF THE DRAWING

The above and other objectives and features of the invention may be fully appreciated from the following detailed description which should be considered in conjunction with the accompanying drawing.

FIG. 6 illustrates an application of the invention wherein echo protection is utilized.

DETAILED DESCRIPTION

Figure 1:
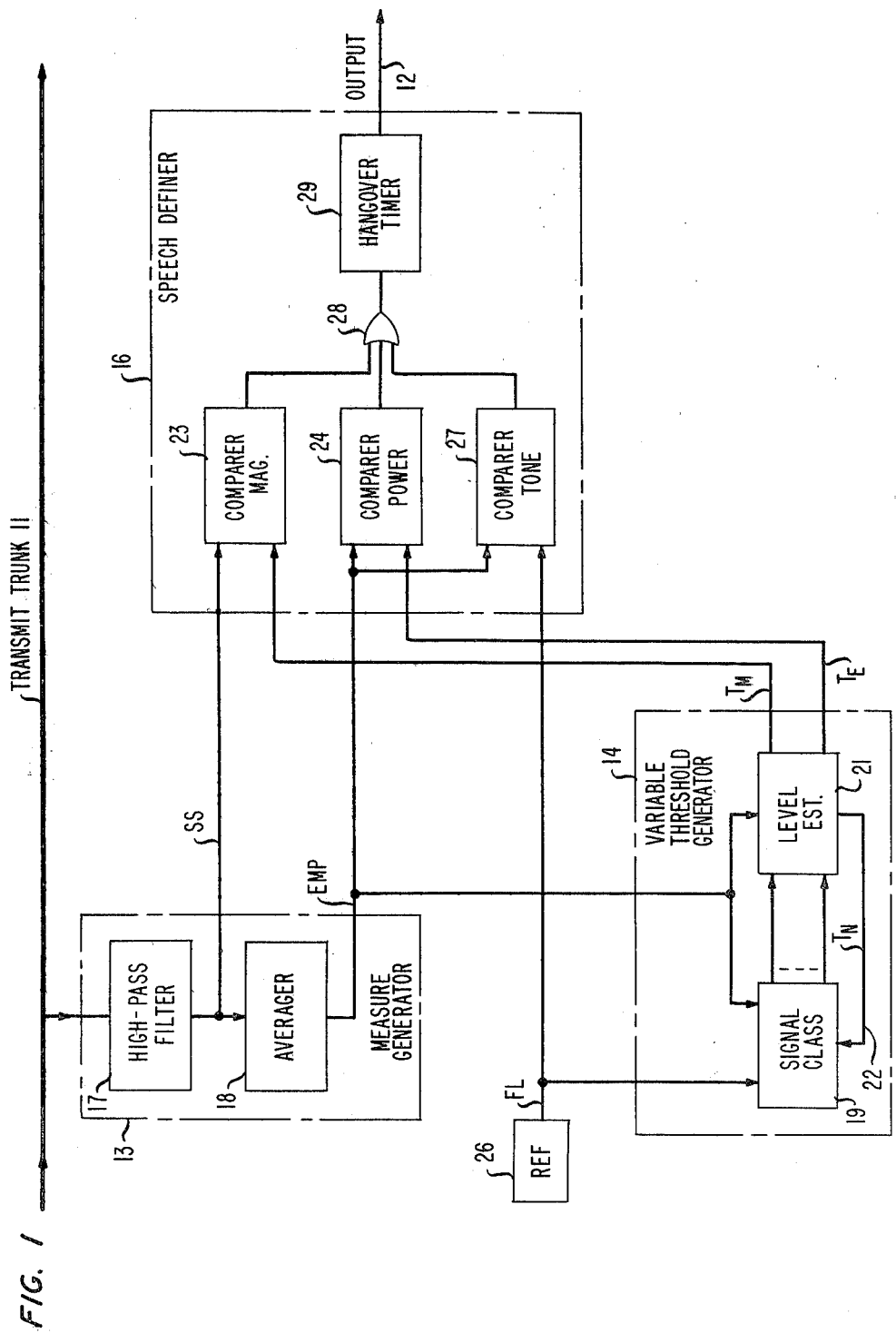
FIG. 1 is a diagram of a basic speech detector constructed in accordance with the present invention.

In FIG. 1, transmit trunk 11 represents a typical telecommunications trunk which carries digital signals including speech. All of the signals on trunk 11 are presented for evaluation by the circuitry in FIG. 1 which forms an illustrative speech detector. The primary function of the speech detector of FIG. 1 is to signal at output 12 when speech signals are present on trunk 11. Versions of the signal on trunk 11 produced via measure generator 13 are applied to variable threshold generator 14 and speech definer 16. Briefly, variable threshold generator 14 develops relatively long term, continuous, adjustable, levels which are used by speech definer 16 as decision levels. When the decision levels are exceeded, an active speech indication is produced at output 12 for the duration of the detection period plus an interval following the cessation of such speech activity previously referred to as hangover.

The hangover interval of the speech detector embodiment of FIG. 1 may comprise either a fixed interval of time or a variable interval of time or both. The improved speech definition of the present speech detector enables a relatively small fixed hangover of 16 ms to provide acceptable performance. The hangover interval also serves to bridge short gaps between speech intervals which, in turn, desirably reduces the number of service requests, i.e., the number of changes in state of the binary active speech identification signal at output 12.

In measure generator 13, the signal from transmit trunk 11 is filtered by high-pass filter 17 to suppress direct current offsets, power line crosstalk, and the like to ensure more accurate operation of the speech detector. Measure generator 13 produces two outputs which are the single sample (SS) magnitude signal and the exponentially mapped past (EMP) signal which is an average representation of the signal power or energy. This average signal is produced by exponential weighting at past single sample magnitude signals is averager 18. The equivalent time constant of averager 18 is 16 ms as it may be viewed as the digital equivalent of an analog resistance capacitance (RC) low-pass filter. These two outputs from measure generator 13 provide the primary measures for the processing performed by the remaining circuitry in FIG. 1.

Only the EMP signal is applied to variable threshold generator 14 which includes signal classifier 19 and level estimator 21. Signal classifier 19 may be expanded further to recognize additional signal types besides the speech and noise outputs for level estimator 21. It should be noted that the operation of signal classifier 19 and level estimator 21 may be considered to be bootstrapped by virtue of conductor 22 which feeds back a threshold signal ($T_N$) from level estimator 21 to signal classifier 19. The two other outputs of level estimator 21 are the magnitude ($T_M$) decision level and the lower energy ($T_E$) decision level which are utilized by respective comparers 23 and 24 in speech definer 16. For the other signal inputs, the single sample magnitude is applied to comparer 23 while the EMP signal is applied to comparer 24. Comparer 23 serves to provide a rapid response to a loud talker while comparer 24 provides a slower, but sure response to a lower level talker. Reference 26 produces a fixed level for signal classifier 19 and comparer 27 of speech definer 16. The fixed level (FL) is used so that comparer 27 activates the speech detector for the typical $-30$ dPmO tone levels used for signaling purposes. This level corresponds in the $\mu$ law coding format to level 32. It should be pointed out that this feature is primarily a function of the system where the speech detector is used and, of course, may be modified or omitted without affecting the actual speech detection function. The outputs of comparers 23, 24 and 27 are logically combined in OR gate 28 to produce an output from the gate for speech definer 16 when the decision level of any comparer is exceeded.

After the output of gate 28 has ceased for a period of time, hangover timer 29 will have produced an output for the duration of the output of gate 28 extended by the hangover interval. Should the output of gate 28 reappear before the hangover interval lapses, hangover timer 29 will be reset and provide the bridging function which was previously mentioned. In any case, timer 29 will always extend the duration of the output of gate 28 by the prescribed duration of the hangover interval.

Figure 2:
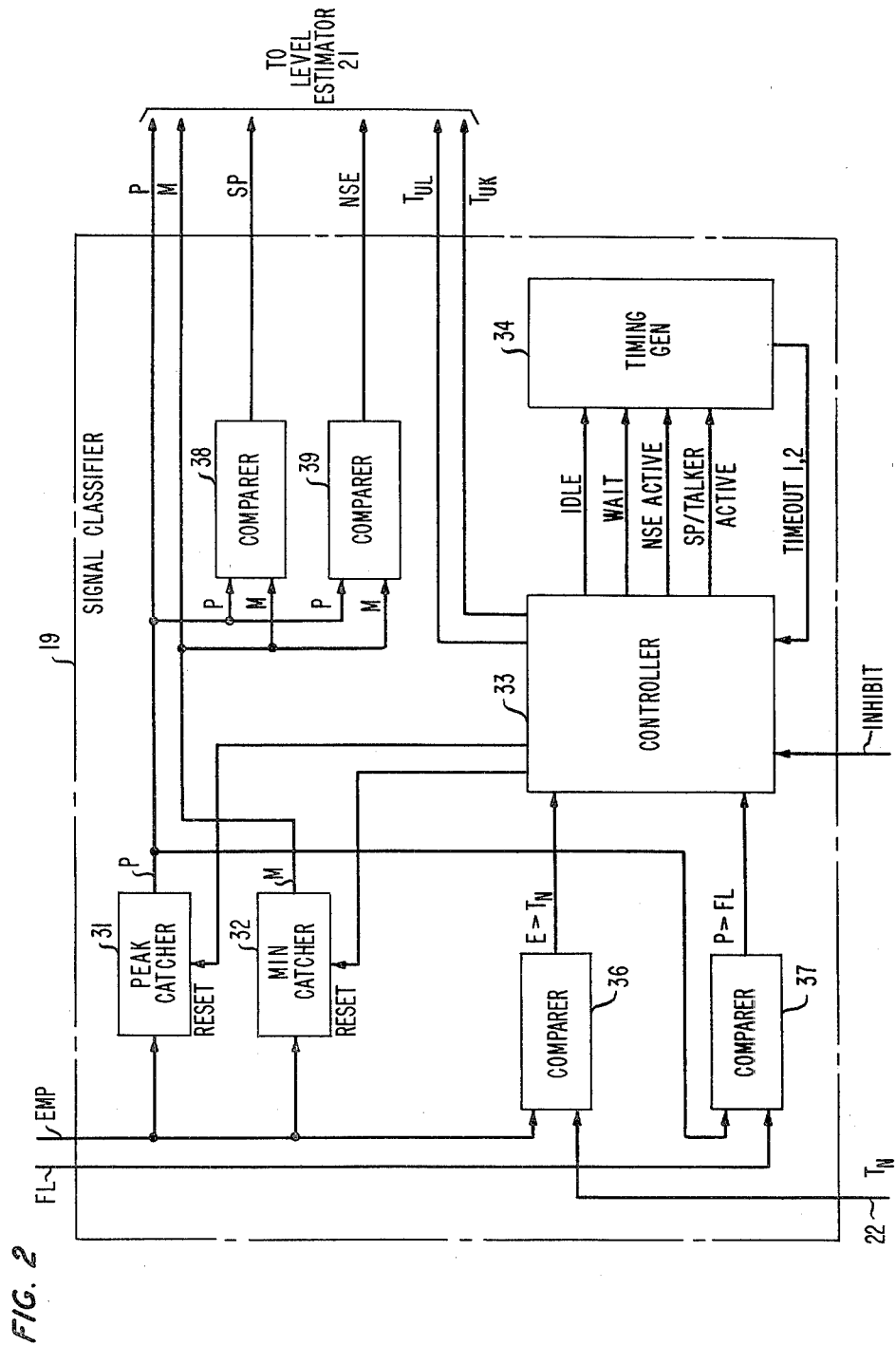
FIG. 2 illustrates the internal circuitry of a signal classifier suitable for use in FIG. 1.
Figure 3:
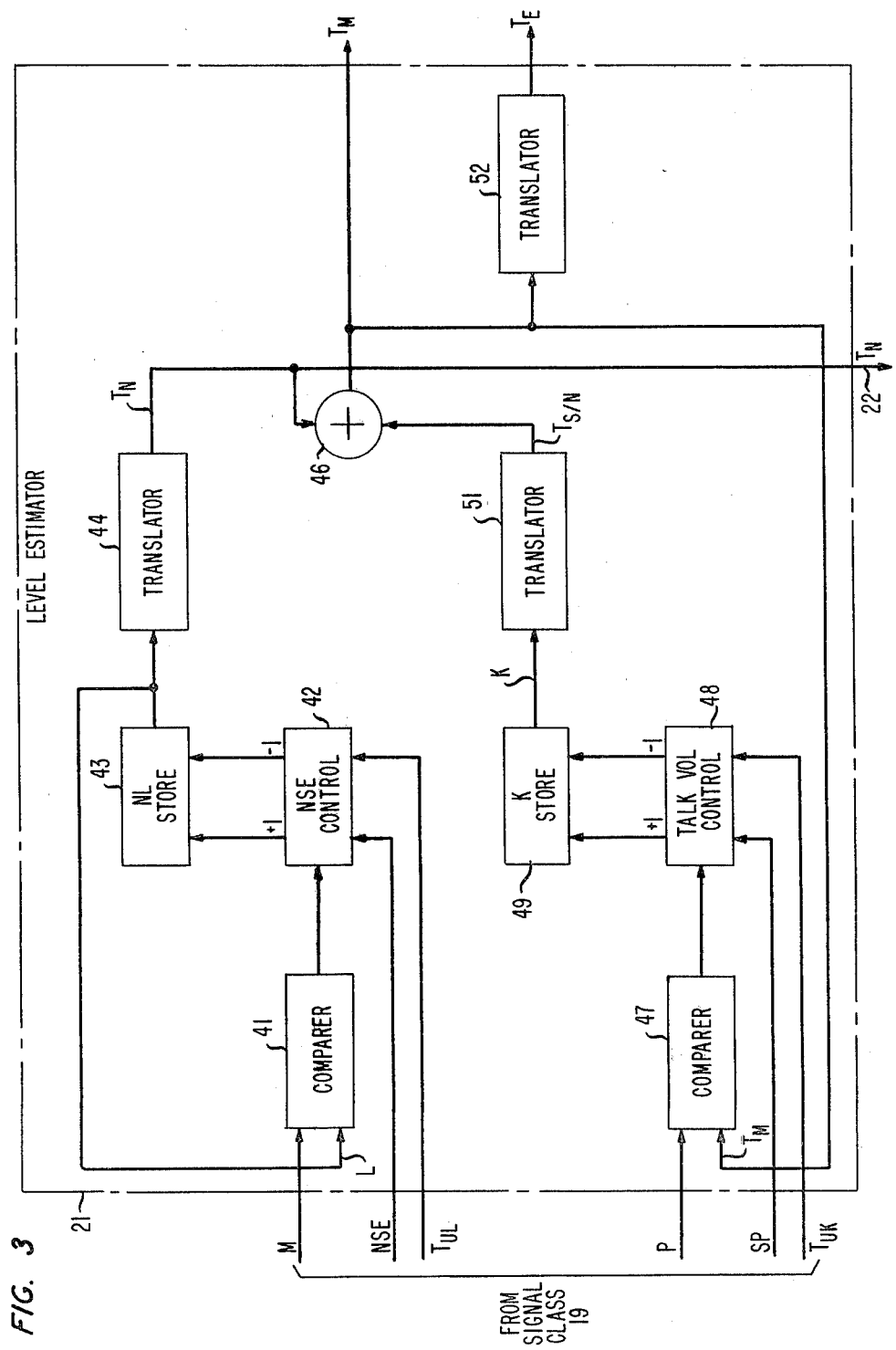
FIG. 3 depicts the circuitry of a level estimator suitable for use in FIG. 1.

FIGS. 2 and 3 respectively depict the circuitry of signal classifier 19 and level estimator 21 of variable threshold generator 14 which develops dynamically adjustable decision levels for speech definer 16. Since this portion of the speech detector provides the basis of its operation and performance, generator 21 will be described in detail. Briefly, generator 14 is designed to take into account the particular talker and noise level on the trunk currently being serviced to provide the best grade of service for all talkers within a relatively wide range of possible background noise levels and without producing excessive spurious activity indications at output 12. The specifics of the description to follow is based on the application dependent assumption that the digital encoding to the signals on trunk 11 is in accordance with the standard Bell System 8-bit $\mu$ 255 format ($\mu$ law) wherein approximately 256 levels are used and the minimum negative and positive maximum levels of 127 are attained by the peaks of a $+3$ dPmO sinusoidal waveform. However, those skilled in the art may readily apply the inventive principles to any desired encoding format and also to operate directly with analog signals.

In FIG. 2, the EMP average representation is applied to peak catcher and store 31 and minimum catcher and store 32 which serve respectively to extract and retain the peak (P) and minimum (M) of the EMP signal values. Since the timing used to obtain these signal values is determinative on the outcome, controller 33 issues pulses for resetting stores 31 and 32 at appropriate times. For the time being, it is sufficient to describe controller 33 as being essentially a four state sequence machine which establishes appropriate time constants for each signal measure to match the variety of signaling conditions produced by a typical telecommunications trunk. These states are designated as IDLE, WAIT, NOISE ACTIVE and SPEECH/TONE ACTIVE. Each state has an associated conductor for indicating machine status to timing generator 34. The inhibit input to controller 33, which serves to suspend operation, will not be discussed further at this time since its function is used in the application depicted by FIG. 6. Timing generator 34 serves as an interval timer which helps to control the state transitions that occur within controller 33. Additional information pertaining to controller 33 will be provided in the discussion of the state sequence diagram shown in FIG. 4. The EMP signal is also applied to comparer 36 which will produce a signal to indicate to controller 33 when the EMP signal is greater than a noise level of $T_N$ which is fed back from level estimator 21. The remaining signal input to controller 33 is provided by comparer 37. Each time the peak from store 31 exceeds the fixed level (FL) from reference 26 comparer 37 indicates same for controller 33. Comparers 38 and 39 each receive both the P and M signal values from stores 31 and 32. Comparer 38 provides a speech (SP) output to indicate a speech produced EMP signal when $P > 2M + 16$. Comparer 39, on the other hand, identifies a noise produced EMP signal with a NSE output when $P < 1.5M$. It is again that these particular ratios are a function of $\mu$ law coding while the underlying principles are applicable to other coding formats.

Figure 4:
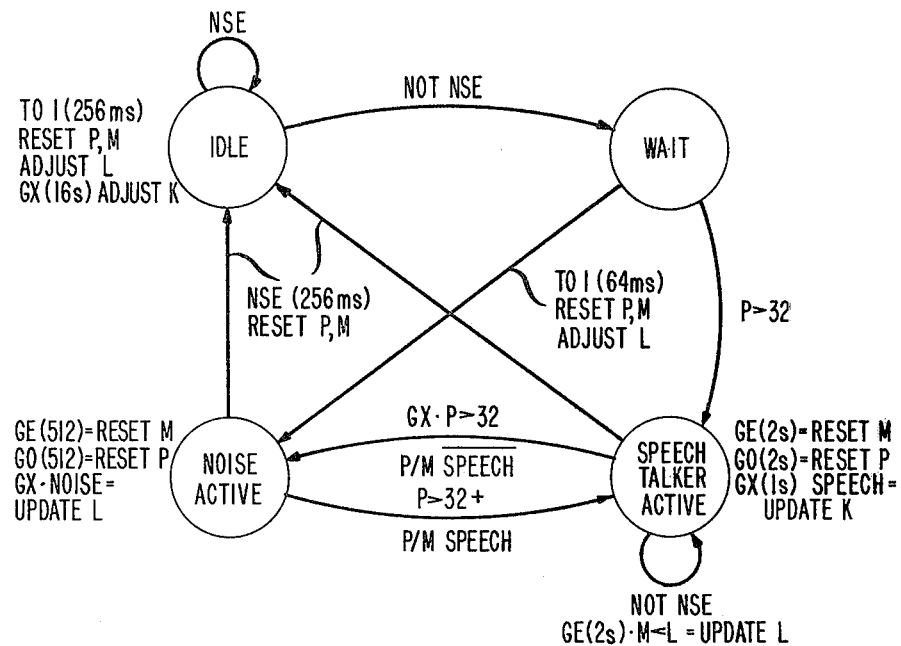
FIG. 4 is a state diagram which illustrates the operation of the controller used in FIG. 2.

FIG. 4 is a state diagram for describing the operation of controller 33 of FIG. 2. In other words, controller 33 is a particular one of what is known in the art as sequential machines which are usually described by way of state diagrams. See, for example, Donald R. Haring, *Sequential-Circuit Synthesis: State Assignment Aspects* (Cambridge, Mass.: The MIT Press 1966). As can be readily observed, there are the four previously identified states in FIG. 4. At the outset, it is to be understood that the operation of the circuitry of FIGS. 2 and 3 is associated with a particular one of the several trunks typically connected to a TASI System. Accordingly, these four states may be thought of as trunk status store states which each have individual time constants for associated signal measures that may be thought of as trunk signal history formed from accumulations of previous signal measures. Furthermore, it is to be understood that the functioning of threshold generator 14 is independent of the actual speech detection function provided by speech definer 16 of FIG. 1. However, generator 14 provides the variable dynamic threshold levels that the latter uses in speech detection.

Initially, controller 33 starts in the IDLE state where a counter within timing generator 34 (timer 1) provides pulses to define intervals of 256 ms wherein the peak, P, and the minimum, M, of the EMP of signal energy presumed to be indicative of noise are directly measured and stored to characterize this noise. Also, the value of L, the long term minimum of M, may be incremented one unit in ¼ second intervals in the direction of $L = M$ should this be necessary. Another function which occurs in the IDLE state and between connections of the trunk is that K, the talker level estimate, is incremented one unit every 16 seconds to make it equal to a typical talker within a rather large range ($\approx 45$ dB.) defined by upper and lower limits. Each unit change is equivalent to a 3 dB level shift. In particular, high thresholds left over from loud talkers are reduced while low thresholds left over from weak talkers are increased in anticipation of a new talker at a more likely talker level. This operation of characterizing noise only takes place until the EMP level exceeds the $T_N$ level when controller 33 switches to the WAIT state.

Figure 5:
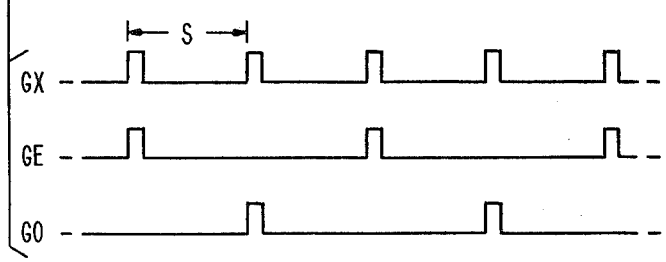
FIG. 5 depicts the timing relationship between granularity pulses used in the operation of the controller of FIG. 2.

In the WAIT state, the first event which may possibly occur is that P of the EMP energy average exceeds a high fixed threshold of $\mu$ law level 32 which corresponds to about $-30$ dBmO. Since this high energy level is assumed not to be noise, controller 33 will switch to the TALKER ACTIVE state. If this does not occur, the noise from the trunk which produced the state transition most likely was a transient condition, such as a pop or a click, then timer 1 will time out in 64 ms and switch controller 33 to the NOISE ACTIVE state. However, the values of P and M obtained from this signal condition that produced this transition are stored and used to adjust L. While in NOISE ACTIVE, another timer in timing generator 34 (timer 2) is triggered by signal transitions to produce a pulse repetition rate referred to as granularity, GX, which is divided into two slower pulse rates designated as granularity even, GE, and granularity odd, (GO). As illustrated in FIG. 5, the first pulse to occur of the two slower pulse rates after the signal transition is the GE pulse. The letter S designates the spacing or timing interval of the pulse repetition rate. It will become evident that a variety of pulse repetition rates are utilized to provide different time constants appropriate to the signal measure being performed during the several signaling conditions. In each case, the designated timing serves to identify the appropriate pulse repetition rate.

Now if the noise signal previously referred to as a click or pop was produced by the trunk being switched for a new call with a higher background noise level, the previously experienced M and P will be reset at the occurrence of GE and GO pulses respectively in 512 ms intervals while controller 33 is in the NOISE ACTIVE state. Also the GX pulses will serve for updating L in ¼ second intervals. After the levels of M and P are used to adjust L and 256 ms elapse without the signal energy exceeding the $T_N$ noise threshold, controller 33 will switch back to the initial IDLE state. The 256 ms interval is provided by timer 1 to provide a hangover or bridging function. While in the NOISE ACTIVE state the ratio of P/M is calculated to ascertain the occurrence of a low level speech signal. If the ratio of P/M is high enough to indicate speech, i.e., $P > 2M + 16$ or the value of P exceeds the fixed level, controller 33 will switch to the TALKER ACTIVE state. The state path including IDLE, WAIT, NOISE ACTIVE and returning to IDLE, however, may typically occur a number of times without entering the TALKER ACTIVE state due to various types of activities within the telephone plant. However, after following this path, the variable thresholds of $T_M$ and $T_E$ are better reference levels for use in detecting speech activity.

When controller 33 switches to the TALKER ACTIVE state from either the WAIT or NOISE ACTIVE states, timer 2 of timing generator 34 provides longer duration timing intervals for the measures associated with speech activity. These include resetting M and P upon the occurrence of respective granularity pulses GE and GO at 2 second intervals. This state is given a certain latitude of stability by timer 1, which provides 256 ms of hangover by resetting timer 1 any time the signal energy exceeds the $T_N$ noise threshold during the hangover interval. Also, K is updated at one second intervals defined by the GX pulses and L is updated at two second intervals defined by the GE pulse train. If the signal happens to be a tone, the P/M ratio will be lower than 1.5 and no K update occurs. In addition, if the level of the peak, P, is less than the fixed threshold, and the signal is classified as not speech, a state transition results to the NOISE ACTIVE state upon the occurrence of the next GX pulse. If the signal level drops below the noise threshold levels for a period of 256 ms, controller 33 will switch back to the IDLE state and reset the values of P and M obtained from the current noise levels.

In FIG. 3, level estimator 21 rceives the outputs from FIG. 2 designated P, M, SP, and NSE. In addition, there are outputs directly from controller 33 which are used for updating. These outputs are T update noise or $T_{UL}$ and T update speech or $T_{UK}$. In level estimator 21, comparer 41 receives the M signal and the noise level L signal which generally corresponds to the long term minimum of EMP. The value of L is obtained from noise level store or NL store 43 which is incremented by noise control 42 when it is clocked at ¼ second intervals via the $T_{UL}$ line from controller 33. From the comparison of M and L at the end of each update interval the value of L in store 43 may not be adjusted at all or adjusted one unit in either a positive or negative manner in the direction to obtain L=M. The other input to noise control serves as an enabling signal. This is the noise (NSE) signal obtained from comparer 39 of FIG. 2. which signals the presence of a noise signal when there is a low ratio in the comparison of the current peak (P) to minimum (M) signal values. Each adjustment increment is equivalent to approximately a 1 dB change in the value of L retained by store 43. This stored value is then altered by translator 44 to form the noise threshold or $T_N$ signal value before application to adder 46. This alteration or adjustment is primarily a function of the coding characteristic used to form the digital signal in trunk 11. For $\mu$ law, translator 44 multiplies L by 1.5 and then adds one to form $T_N$.

For the speech signal levels comparer 47, talk volume control 48, K store 49, and translator 51 perform a very similar operation. Since in this case the output of adder 46, designated $T_M$, is the sum of the outputs from translators 44 and 51 and provides one input to comparer 47, the comparison must be again related to the properties of the coding format used in providing the digital signal. For a completely linear coding format, $T_M$ would be compared with P times a factor slightly greater than one. For a strictly logarithmic coding format, $T_M$ would be compared with P minus a constant dB value. In the case of $\mu$ law, a piecewise comparison is made since low levels are linearly related while high levels are linear on a logarithmic scale. When 2P is less than forty-eight, the value of K is eventually decremented to zero at which point $T_M$ corresponds solely to the noise level. In the range where 2P is greater than forty-eight but less than eighty, $T_M$ is compared with 2P—16. Then the value of K is incremented when $T_M$ is smaller and decremented when $T_M$ is larger than 2P—16. When P is larger than eighty, $T_M$ is compared to 2P—24 and the value of K will be increased when $T_M$ is smaller and decreased when $T_M$ is larger than 2P—24. The output of comparer 47 may, as previously stated, signal no adjustment as a result of these comparisons.

Another input to control 48 is the SP signal of comparer 38 which enables the adjustment only when the P/M ratio is indicative of speech. Each adjustment increment to the value in K store 49, is equivalent to about a 3 dB change in value at the output of translator 51 which provides a level, designated as $T_{S/N}$, since it is a ratio of the talker level to the noise level. For the $\mu$ law coding characteristic, translator 51 actually performs a multiplication by a factor of eight.

Accordingly, the latter circuitry forms an estimate of talker level derived from the peak of the average representation (P) normalized by L the noise level estimate which is combined in adder 46 whose output is $T_M$. $T_M$ is compared by comparer 23 of FIG. 1 directly with the single sample magnitude. $T_M$ is also applied to translator 52 whose output is $T_E$ a lower decision level for comparison to the EMP (signal power or energy) by comparer 24. This latter comparison insures a sure response to lower level talking signals while the former comparison provides a fast response to higher level talking signals. For $\mu$ law, translator 52 divides by a factor of four.

FIG. 6 depicts the application of the speech detector embodiment of FIG. 1 in a typical two-way transmission environment subject to echo in the form of signal leakage on transmit trunk 111 from receive trunk 115. The basic speech detector for transmit trunk 111 comprises measure generator 113, variable threshold generator 114, transmit speech definer 116 and reference 126 which function to provide an activity signal on conductor 112 indicative of the occurrence of speech for echo protector 113. Incidentally, the reference numerals in FIG. 6 whose last two digits correspond to FIG. 1 are used to designate identical components.

It should be pointed out that in system applications, such as Time Assignment Speech Interpolation (TASI) or Digital Speech Interpolation (DSI), the value of L (noise level estimate) and the value of $T_M$ (talker level estimate) are useful measures. For example, the value of L can be used to provide noise fill to prevent the perception of disconnects in a TASI arrangement. The remaining components in FIG. 1, namely, measure generator 132, stretcher 133, receive speech definer 134, break-in definer 156 along with echo protector 131 serve as a receive speech detector for interrupting the operation of the transmit speech detector. This enables the correct designation of intervals for accurate decision level determination. In other words, adaptation of decision level should only occur using transmit signals not contaminated by echo leakage signals. Furthermore, the ability to detect expected echo energy prevents a request for trunk service if only echo is present and also allows the transmit speech detector to request trunk service in spite of the presence of echo. It should also be pointed out that the arrangement of FIG. 6 is required even though some form of echo protection is used in the transmission environment since echo protection techniques typically will not always eliminate echoes.

Aside from the basic operation of the transmit speech detector which remains primarily the same as before, the differences in operation attributed to the components used in the receive portion of the arrangmenet of FIG. 6 will be described. Measure generator 132 provides a receive exponentially mapped past (REMP) signal derived from receive trunk 115. Stretcher 133 uses this signal at its input and a version of it internally delayed by about 24 ms to provide a stretched REMP (SREMP) signal output whose amplitude at any instant corresponds to the greater of current REMP signal and any other previous REMP signal in the designated delay interval. Another and, perhaps, more descriptive term for stretcher 133 is an echo envelope generator. The delay of stretcher 133 takes into account the signal propagation experienced as the receive signal travels over the leakage path (indicated by the dashed arrow in FIG. 6) of a remotely located hybrid transformer where the signals of trunks 111 and 115 are combined for two wire transmission. This is the signal path which must be traveled by the receive signal before it appears on transmit trunk 111. Break-in definer 136 compares the TEMP and SREMP signal levels obtained from respective measure generator 113 and stretcher 133. Definer 136 issues a signal to indicate that the transmit energy exceeds the stretched and delayed receive energy. The break-in signal is supplied to echo protector 133 along with the output of speech definer 116.

The output of measure generator 132 is also applied to speech definer 134 whose output indicates when the input exceeds a fixed threshold representative of minimal but significant signal energy. Thus the speech detector arrangement for the receive signal need only be a simple energy detector which serves to indicate the presence of significant signal energy whether it constitutes speech and/or tone. This signal is applied to the inhibit input of generator 114 to stop the adaptation of the decision levels when the signal levels of trunk 111 are contaminated by echo signal energy.

Echo protector 131 provides an output designated as trunk needs service (TNS) to indicate the occurrence of active speech signals on trunk 111. This output is produced when the signal on conductor 112 indicates speech signal activity and definer 136 produces a break-in (BI) signal. If the activity signal ceases, or BI ceases then the TNS signal switches to a level indicative of an idle condition. When the TEMP>SREMP ceases, the BI signal will switch to the idle state only after the termination of a hangover interval or speech activity ceases. A hangover duration on the order of 256 ms has proven to provide satisfactory performance.

Figure 8:
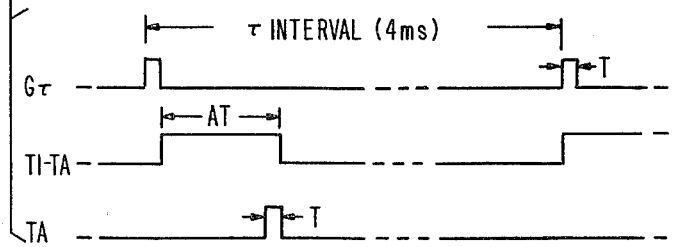
FIG. 8 illustrates the timing of pulse waveforms used in the operation of the circuit of FIG. 7.
Figure 7:
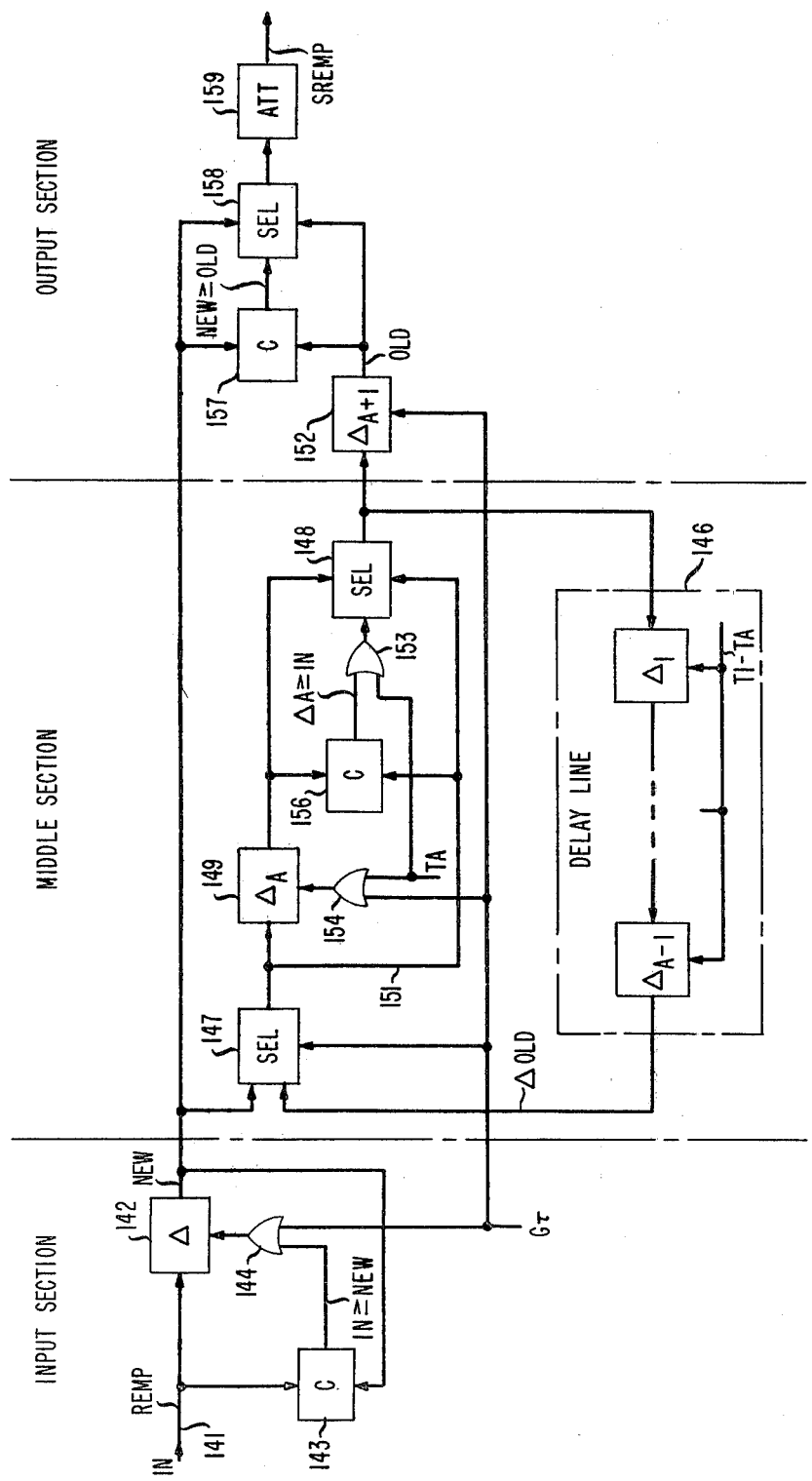
FIG. 7 is a circuit diagram of the type of stretcher employed in FIG. 6.

FIG. 7 depicts the circuit diagram of stretcher 133 in FIG. 6. The dashed lines in FIG. 7 partition the circuit into an input section which is a peak catcher, a middle section which saves the last $A\tau$ peaks, and an output section which selects the greater peak from the other two sections. To input 141, delay 142 and comparer 143 are connected for application of the REMP signal. Delay 142 has an enable terminal connected for activation by the output of OR gate 144. Gate 144 forces delay 142 to accept the REMP signal each time a $G\tau$ pulse reoccurs. FIG. 8 illustrates the $G\tau$ pulse and its relationship to the other pulses used to operate the circuit of FIG. 7. The output of delay 142 is connected to the other input of comparer 143. Comparer 143 provides an output signal to enable delay 142 via gate 144 when the level of input REMP signal exceeds the signal level stored in delay 142. This condition is indicated by the expression IN≧NEW assigned to the output of comparer 143 in FIG. 7.

The function of the input section is to follow the rising peaks or slopes of REMP signal and then to retain the maximum peak value for the duration of the $\tau$ interval. The increasing signal level is provided access to delay 142 by virtue of the output of comparer 143. In particular, comparer 143 produces this output signal when the signal level at input 141 exceeds the NEW level provided by the present signal value stored in delay 142. When this condition terminates, delay 142 holds the peak until the next $G\tau$ pulse occurs.

The middle section of the circuit of FIG. 7 includes delay line 146 which has A-1 units of delay and a signal comparison portion which includes the circuitry between selector 147 and selector 148. In this circuitry, two signal paths are provided. One signal path extends from the output of selector 147 via delay 149 to a first signal input of selector 148. The other signal path is line 151 extending from the output of selector 147 directly to the other signal input of selector 148. Selector 147 has a control input to which is applied the $G\tau$ pulse. In selector 147, the application of the $G\tau$ pulse completes the signal path from the output of delay 142 to the input of delay 149. Similarly, the occurrence of the high level signal, TA, at the control input of selector 148 via OR gate 153 completes a conductive path from the output of delay 149 to the input of delay line 146. This transfers the contents of delay 149 to the $A_1$ unit of delay line 146 but not to delay 152 since $G\tau$ is absent. When the control signal is low, the other signal input of selectors 147 and 148 is coupled to their respective outputs.

As can be observed from FIG. 7, the control input of selector 148 is connected to the output of OR gate 153 and OR gate 154 is associated with the enable input of delay 149. Accordingly, the occurrence of the TA pulse not only enables delay 149 to accept its signal input but also makes its output available at the output of selector 148 for delay line 146. The other input of gate 153 is connected to comparer 156 which enables the gate when the output level of delay 149 is greater than the signal level on line 151.

The purpose of the middle section of the circuit of FIG. 7 is to store the A past $\tau$ interval peaks. During the $G\tau$ pulse the input to delay 149 is the NEW signal from the output of delay 142 while the output of selector 148 is the larger of the value retained in delay 149 or the NEW signal on line 151 due to the operation of comparer 156. During the portion of the pulse T1-TA not coextensive with the TA pulse, the input to delay 149 is ΔOLD, the previously saved $\tau$ interval peaks stored in delay 146. Now the output of delay 149 is the previously stored NEW value since the output of gate 154 is not enabling the input to the delay at this time. Accordingly, the output of selector 148 is the larger of the old stored values or NEW which is also due to the operation of comparer 156. When the TA pulse occurs, the contents of delay 149 is applied to the first unit of delay line 146 while delay 149 is being loaded with the contents of the last unit in delay line 146 which is the oldest of the previous stored values. This process will be repeated upon occurrence of the next $G\tau$ pulse.

The output section of the circuitry of FIG. 7 includes previously mentioned delay 152 which provides a signal input to comparer 157 and selector 158. Attenuator 159 is connected to the output of selector 158 to provide the SREMP signal with a loss adequate to compensate for the minimum expected return loss of the echo path symbolically indicated in FIG. 6. For TASI systems, this loss is about 6 db. The other signal inputs to comparer 157 and selector 158 are provided by the output of delay 142 which is the NEW signal. Comparer 157 provides the control input for selector 158 so that the selector's output always corresponds to the larger of the NEW signal or the OLD signal.

For a typical application in a TASI system, specific values will provide satisfactory performance. For example, the precision may be defined in terms of time accuracy, $\tau=4$ ms, and bit accuracy, N=8 bits. A total delay of 24 ms is provided with A=4 units in delay line 146 along with the presence of delays 142 and 152 in the input and output sections of stretcher 133. Of course, in other applications different specific values may be readily selected by those working in the art to provide suitable performance.

What has been described hereinabove is but illustrative of the principles of my invention. For example, it will be appreciated that applicant's speech detector, though shown and described in connection with a single transmission channel for purposes of describing the invention, may be shared advantageously among a plurality of transmission channels on a time division multiplexed basis, each channel being connected to the speech detector during a distinct time slot. Numerous and varied other arrangements may be derived by those skilled in the art without departing from the spirit and scope of the invention.

I claim:

1. A signal envelope stretcher comprising:
   peak catching means (142–144) for following rising portions of an input signal and retaining a first output indicative of the peak magnitude of the input signal attained during a predetermined interval;
   storing and comparing means (146–149, 151, 153, 154 and 156) connected to receive and retain the output and a predetermined plurality of previous peak magnitudes corresponding to previous predetermined intervals, the storing and comparing providing a second output indicative of the greater of the first output and each one of the previous peak magnitudes, the second output serving to replace the previous peak magnitudes when greater as it is compared thereto; and
   output means (152, 157, 158) connected to receive the first output and the second output at the beginning of each one of the predetermined intervals, the output means retaining the second output corresponding to the previous first output occurring at the beginning of its corresponding predetermined interval for the duration of the predetermined interval while producing an output for the signal envelope stretcher corresponding to the greater of the stored second output and the first output.

2. A signal envelope stretcher comprising:
   first means for following increasing portions of an input signal and retaining the peak magnitude as its output for a predetermined interval;
   second means including input selecting means, storing means, output selecting means, and feedback means; said input selecting means, connected to the output of said first means, for applying the previous peak magnitude to said storing means as said first means starts retaining each peak magnitude; said feedback means, connected to the output of said output selecting means, for applying its stored contents corresponding to the peak of a predetermined number of successive previous peak magnitudes to said input selecting means for a predefined portion of said predetermined interval after each peak magnitude is accepted by said first means; said output selecting means producing a second output signal corresponding to the greater of the peak magnitude stored by said storing means and the contents of said feedback means while said feedback means and said storing means replace their stored contents with said second output; and
   third means including retaining means and selector means, said retaining means accepting the previous peak magnitude stored from said storing means made available by said output selecting means as said storing means accepts the next peak magnitude; and said selector means connected for producing as an output of the signal envelope stretcher the larger of two peak magnitudes stored by said retaining means and stored by said first means.

* * * * *